United States Patent
West et al.

(10) Patent No.: US 6,487,824 B1
(45) Date of Patent: *Dec. 3, 2002

(54) COMPRESSION MOLDED DOOR ASSEMBLY

(75) Inventors: Kenneth J. West, Grabill, IN (US); G. Daniel Templeton, Fort Wayne, IN (US)

(73) Assignee: TT Technologies, Inc., Maumee, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/619,598

(22) Filed: Jul. 19, 2000

Related U.S. Application Data

(63) Continuation of application No. 09/116,405, filed on Jul. 16, 1998, now Pat. No. 6,092,343.

(51) Int. Cl.⁷ ................................ E04B 2/22
(52) U.S. Cl. .............. 52/309.11; 52/309.1; 52/309.9; 52/311.1; 52/313; 52/315; 52/479; 52/483.1; 52/475.1; 52/455; 52/784.1; 52/784.15; 52/789.1; 52/794.1; 52/800.1; 52/801.1; 52/745.19
(58) Field of Search ............... 52/309.9, 309.11, 52/311.1, 313, 315, 479, 483.1, 475.1, 455, 784.1, 784.15, 789.1, 794.1, 800.1, 801.1, 745.19

(56) References Cited

U.S. PATENT DOCUMENTS

| | | |
|---|---|---|
| 4,105,623 A | 8/1978 | Shannon et al. |
| 4,485,590 A | 12/1984 | Legg et al. |
| 4,550,540 A | 11/1985 | Thorn |
| 4,755,557 A | 7/1988 | Atkins et al. |
| 5,001,000 A | 3/1991 | Rohrbacher et al. |
| 5,075,059 A | 12/1991 | Green |
| 5,084,494 A | 1/1992 | McDougal |
| 5,175,970 A | 1/1993 | Green |
| 5,202,366 A * | 4/1993 | Reid et al. .................. 523/516 |
| 5,236,976 A | 8/1993 | Michaels |
| 5,239,799 A | 8/1993 | Bies et al. |
| 5,268,400 A | 12/1993 | Iseler et al. |
| 5,306,773 A | 4/1994 | Wiseman et al. |
| 5,395,866 A | 3/1995 | Ross et al. |
| 5,491,184 A * | 2/1996 | McBain et al. ............. 523/436 |
| 5,521,232 A * | 5/1996 | Gynn et al. ................. 523/513 |
| 5,537,789 A | 7/1996 | Minke et al. |
| 5,880,180 A * | 3/1999 | Smith ......................... 523/508 |
| 5,932,314 A * | 8/1999 | West .......................... 52/313 X |
| 5,932,666 A * | 8/1999 | Fisher ......................... 525/438 |
| 6,092,343 A * | 7/2000 | West et al. ............... 52/309.11 |

* cited by examiner

Primary Examiner—Carl D. Friedman
Assistant Examiner—Christy M. Green
(74) Attorney, Agent, or Firm—Brooks & Kushman P.C.

(57) ABSTRACT

A door member comprising a frame having a first side and a second side, opposite the first side, a core positioned within the frame, and a molded skin attached to the first side of the frame. The skin is prepared from a molding compound which, when molded, has a shrinkage of between about −0.0003 to about +0.0015. The molding compound comprises a resin system comprising a curable polyester resin, a co-curable unsaturated monomer, and at least two low profile additives. The molding compound also comprises at least about 30 percent by weight, based on the weight of the molding compound, of filler material, and fibrous reinforcement in an amount of less than about 35 weight percent, based on the weight of the molding compound.

92 Claims, 2 Drawing Sheets

COMPRESSION MOLDED DOOR ASSEMBLY

CROSS REFERENCE TO RELATED APPLICATIONS

This application is a continuation of U.S. application Ser. No. 09/116,405, filed Jul. 16, 1998. Now U.S. Pat. No. 6,092,343.

TECHNICAL FIELD

The present invention is directed to a door member, and more specifically, to a door member having compression molded fiberglass door skins.

BACKGROUND ART

Door members have been manufactured from solid wood slabs for many years. However, solid wood door members have many disadvantages. For instance, solid wood door members can experience significant dimensional changes with variations in temperature and humidity. This can result in cracking and splitting. Also, maintenance of finishes is crucial to preventing degradation of the wood materials. In response, many consumers began using doors manufactured from more durable and dimensionally stable materials.

Recent engineering changes in wood doors have made use of laminated wood materials and thin surface veneers in an attempt to overcome the disadvantages associated with solid wood door members. However, new problems with delamination of the veneers, substrate dimensional changes, as well as continuing finishing maintenance are compounded by increased costs of wood products. This has resulted in door member products that lack consumer acceptance. Thus, the market shares of solid and laminated wood entry doors have continued to decrease.

Steel doors, which superseded wood doors in the market place, hold the majority share of the market, due mostly in part to their low cost relative to wood doors. Steel doors also have the advantage over doors made of solid and laminated wood materials of having greater insulation efficiency. Steel doors, however, have many undesirable characteristics. For instance, steel doors dent readily during construction and homeowner use. Moreover, the surfaces of the steel doors rust, especially when in service at houses in relative close proximity to salt water, and feel cold to the touch during cold weather conditions.

Fiberglass door members comprising fiberglass reinforced compression molded skins have recently become a door member product that has acquired consumer acceptance. Manufacture of these door members is known in the art; for example, U.S. Pat. Nos. 4,550,540; 4,720,951; and 5,537,789, which are incorporated herein by reference. Fiberglass door members typically comprise a door-shaped wooden frame member, a polymeric foam-type core positioned within the frame member, a first fiberglass reinforced compression molded door skin secured to a first side of the frame member, and a second fiberglass reinforced compression molded door skin secured to a second side, opposite the first side, of the frame member. The fiberglass reinforced compression molded door skins are prepared from a molding compound.

The fiberglass door members compare favorably to wood material doors in that they are less expensive than wood material doors. Moreover, fiberglass door members overcome the cracking, splitting, delaminating veneers and poor insulating efficiency associated with wood doors. Furthermore, these fiberglass door members compare favorably to steel doors in that they resist the denting, rusting and do not have the cold feel associated with steel doors. However, these fiberglass door members have, up until now, not been able to be made to have an exterior surface as smooth as steel doors or sanded wood doors.

Steel door exterior surfaces are relatively smooth and produce the appearance of a smooth exterior surface when painted. Wood doors, while having relatively coarse exterior surfaces, are sandable, before being painted, to produce the appearance of a smooth exterior surface when painted. The molded door skins of the prior art fiberglass door members have been molded to have exterior surfaces which have a very coarse wood grain pattern to simulate the appearance of a wood door when stained. However, these prior art fiberglass door members, when painted, have the appearance of a painted, unsanded, relatively coarse wood door member.

Many consumers do not find the appearance of such painted fiberglass door members aesthetically pleasing. Since, the exterior surface of a fiberglass door member cannot be sanded to produce a smooth surface, these consumers purchase wood doors or steel doors if they desire a painted door having a relatively smooth appearance. An apparent solution might seem to be to mold the door skins in a mold having smooth faces to produce door skins having smooth exterior surfaces. However, this has not proven to be a solution because the prior art molding compounds are not capable of producing a surface smooth enough to simulate painted steel or sanded wood doors, when painted, due to surface variations created in the molding process caused by shrinkage of the molded part.

Accordingly, it is believed that if a fiberglass door member could be manufactured to simulated steel door members and sanded wood members, when painted, that certain consumer preference for steel door or wood members would shift to fiberglass door members. Thus, there is a need for a fiberglass door member that has a smooth enough surface to simulate steel and wood door members when painted.

SUMMARY OF THE INVENTION

The present invention is a door member comprising a frame having a first side and a second side, opposite the first side, a core positioned within the frame, and a molded skin attached to the frame. The skin is prepared from a molding compound which, when molded, has a shrinkage of between about −0.0003 to about +0.0015. The molding compound comprises a resin system comprising a curable polyester resin, a co-curable unsaturated monomer, and at least two low profile additives. The molding compound further includes at least about 30 percent by weight, based on the weight of the molding compound, of filler material, and less than about 35 weight percent, based on the weight of the molding compound, of fibrous reinforcement.

An object of the present invention is to provide a fiberglass door member that has a smooth enough surface to simulate steel and wood door members when painted.

Another object of the present invention is to provide compression molded fiberglass door skins having a relatively low shrinkage when molded.

These and other objects of the present invention will become more apparent from a reading of the specification in conjunction with the drawings.

DETAILED DESCRIPTION OF THE PREFERRED EMBODIMENT

Figures 1, 2:
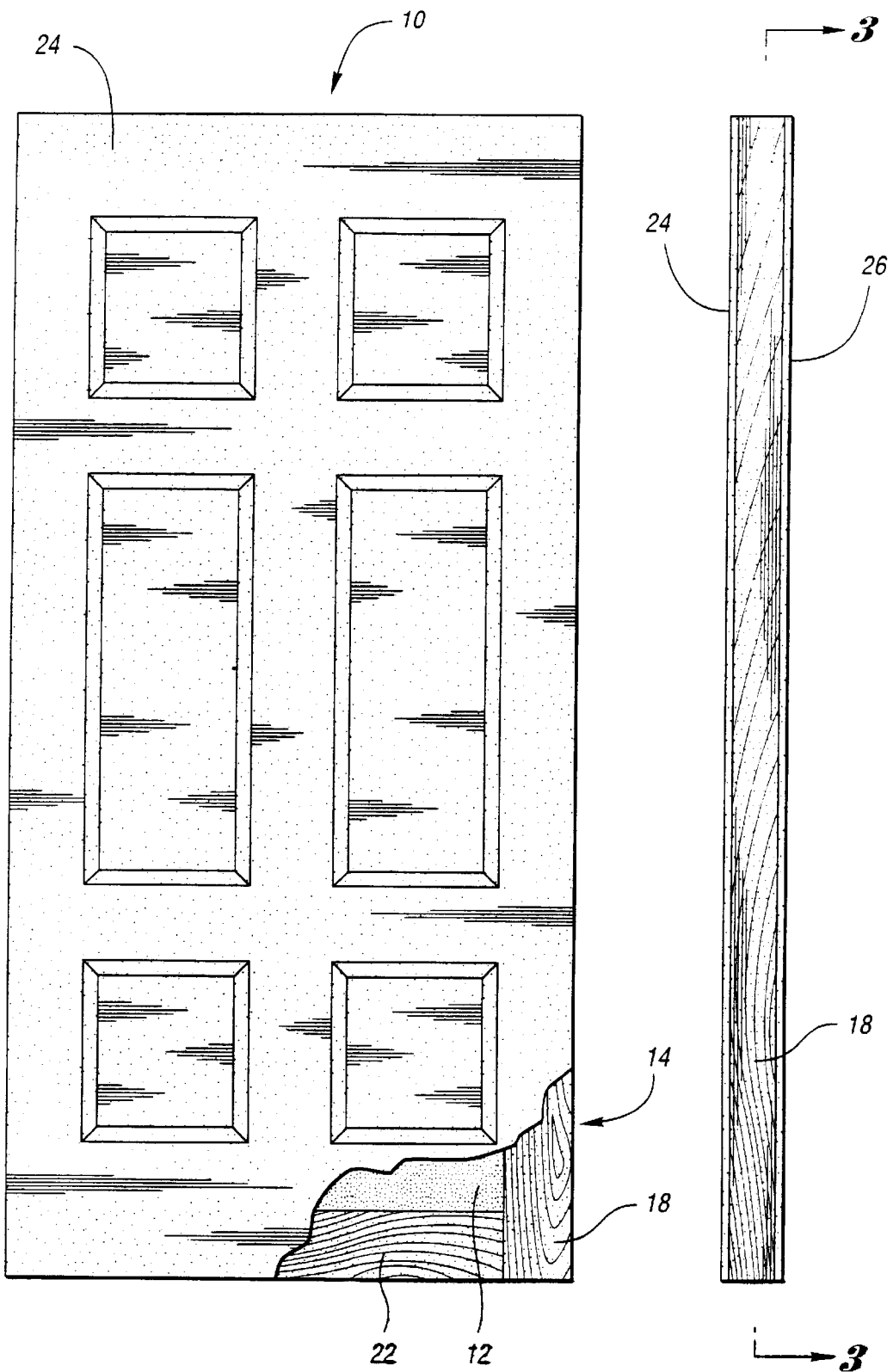
FIG. 1 is a front elevational view of a door assembly according to the present invention.
FIG. 2 is a side elevational view of the door assembly of the present invention.

The present invention will now be described in detail with reference being made to the accompanying drawings. Referring to FIG. 1, a door member 10 is illustrated. In the preferred embodiments, the door member is a fiberglass entry way door. Other door members 10 include, but are not limited to, sidelights, combination entryway door and sidelights, door light frames, door frame, sills and other fiberglass structural members.

Figure 3:
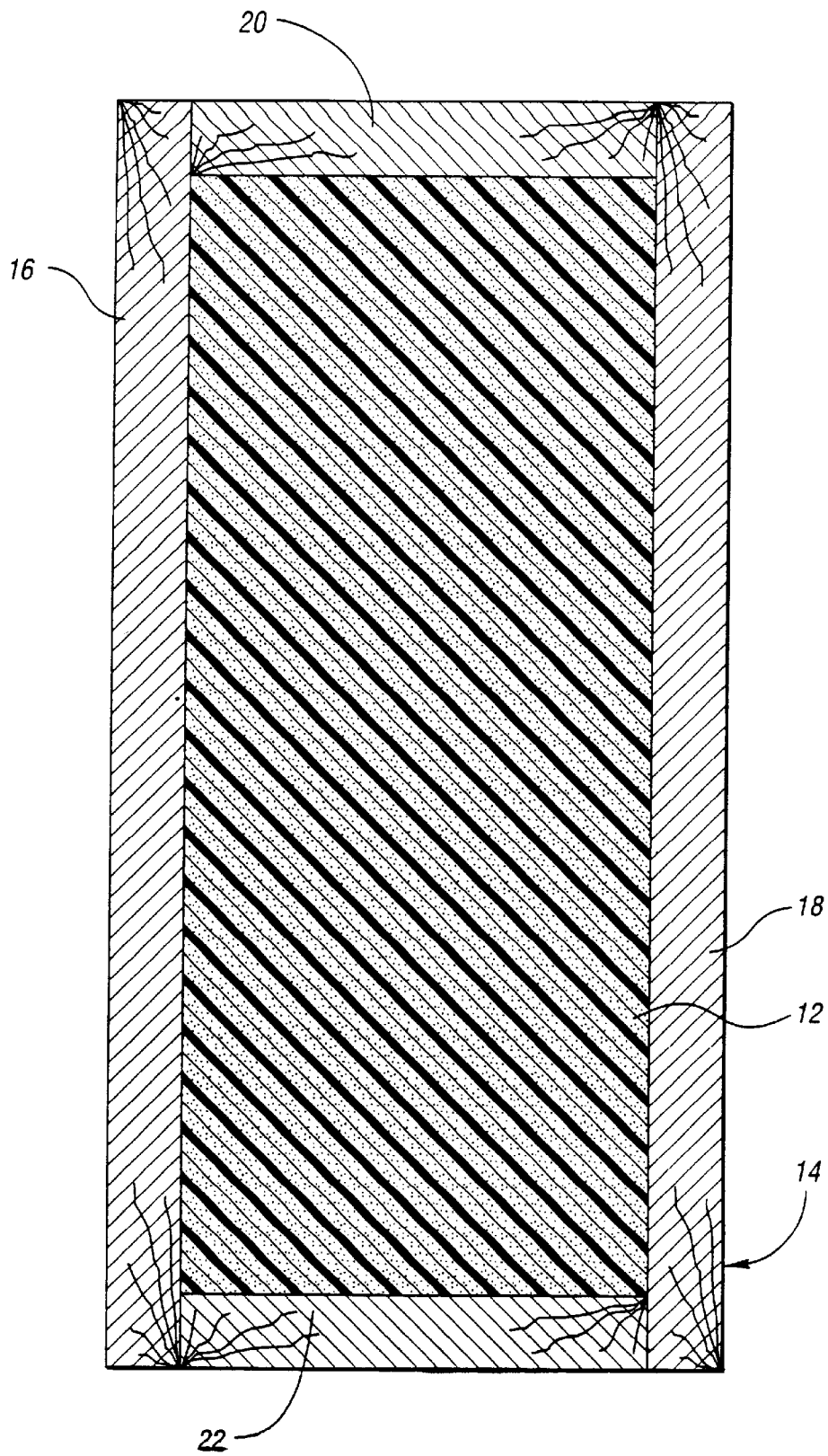
FIG. 3 is a cross-sectional view taken along line 3—3 of FIG. 2 showing the frame of the present invention with the core positioned therein.

Referring to FIGS. 1, 2 and 3, the door 10 includes a core 12 positioned within a frame 14. The core 12 is preferably an inserted core or a core formed in-situ. The core 12 can be made of a variety of materials depending on the application. For example, inserted cores can include continuous or discontinuous compressed mineral board, compressed inorganic fillers with binders, compressed organic fillers with binders, compressed organic and inorganic blends with binders or in-situ formed binder; molded or shaped thermoplastics such as expanded polystyrene, foamed polyvinyl chloride, or foamed or expanded polyolefins; molded or shaped thermosets such as flexible or rigid, solid or foamed polyurethanes, polyurea-urethanes, polyureas, polyisocyanurates, and phenolics; blow molded shells; or honeycomb inserts comprised of organic fibers, organic pulps, thermoplastics, and thermosets; preforms derived from either air-laid or vacuum-laid mats of cellulosic fiber, glass fiber, thermoplastic fiber, or thermoset fiber or woven mats or veil of the same materials where a binder or resin has been applied or injected to shape a core; and blends or mixtures of these various types of insertable cores. In-situ formed cores include cores developed from reaction injection molding with or without reinforcement of thermosets such as polyurethanes, polyureaurethanes, polyisocyanurates, and phenolics; gas injection of a thermoplastic, ceramic, or thermoset; activation of in-situ blowing agents or foaming of material introduced into the shell; mechanical tension applied to melted or softened thermoplastic or thermoset materials; or blends and combinations of these in-situ cores. The choice of a core material is constrained by ±10% dimensional change in the range of −40° C. to 95° C. with ±5% preferred. Most preferably, the core 12 is an in-situ core and is made of polyurethane.

As shown in FIG. 3, the frame 14 includes a first stile 16 and a second stile 18. The stiles 16 and 18 are parallel to one another. The stiles 16 and 18 are positioned in a perpendicular relationship to a first rail 20 and a second rail 22, parallel to, and spaced apart from, the first rail 20. The first and second rails 20 and 22, respectively, extend between and connect the stiles 16 and 18. The frame 14 in FIG. 3 has a rectangular geometric configuration. However, it should be understood that the frame 14 can be arranged in a variety of geometric configurations depending upon the desired application.

The stiles 16 and 18 and rails 20 and 22 are preferably made of wood but could be made of some other suitable material. One of the stiles 16 and 18, and preferably, the first stile 16 could be manufactured to add weight to the door 10 to provide the door 10 with a closing momentum which makes a person closing the door to believe the door to be substantial or "solid". The stile 16 preferably has a width in the range of from about 2.5 cm to 16 cm. The stile 16 can also be a hollow channel of pultruded or extruded reinforced plastic, a metal hollow channel, a partially or totally metal reinforced channel made of a material other than metal, or a compressed mineral stile depending on the application.

As shown in FIGS. 1 and 2, the door 10 includes a first molded skin 24 secured to a first side of the frame 14 and a second molded skin 26 secured to a second side of the frame. The skins 24 and 26 of the present invention preferably have widths between about 0.75 m and about 1.07 m, lengths preferably between about 1.95 m and about 2.45 m, and an average thickness between about 1.0 mm and about 2.5 mm and are novel in that, when painted, simulate the appearance of painted steel or sanded wood doors.

The texture of the surface of the skins 24 and 26 is preferably essentially smooth, such that they can attain a high gloss finish (25–35 units) when painted. The texture of the skins 24 and 26 can be made by a variety of casting, machining, polishing, blasting and deposition processes. These casting processes include silicone molds, epoxy molds, metal molds from sandcasting, metallic shell on a mandrel, electroless metallic disposition on a mandrel and cold isostatic pressing using any of the above texture transfer techniques to create the textured surface for the mandrel. The skins 24 and 26 can be formed with the preferably essentially smooth texture by many molding techniques including resin transfer molding, vacuum assisted resin intrusion, rotational molding, low and high pressure injection molding, as well as low and high pressure compression molding, with high pressure compression molding being preferred. The door skins 24 and 26 can be larger than the frame 14. This allows for the door 10 to be cut squarely, rebated or beveled as required by the user of the door.

The door skins 24 and 26 of the present invention are an improvement over prior art door skins in that they have a much smoother surface than prior art door skins so that, when painted, they have the appearance of a painted steel or sanded wood door. In order to produce a fiberglass door member 10 which, when painted, has the appearance of painted steel or wood door members, the door skins 24 and 26 should be made using a SMC which can attain a long term Loria® number under about 250 and/or an orange peel Loria® number above about 7.5 as determined by a Loria® surface analyzer.

A Loria® surface analyzer measures the surface smoothness of flat objects. The Loria® surface analyzer reflects a laser beam off the surface of a test plaque which has been molded in a mold in which the show surface had been highly polished to a mirror finish. The plaque is typically about 304.8 mm×304.8 mm The reflected beam is projected onto a reflective screen. The image is then picked up off the screen by a high-resolution video camera. The laser beam is moved across the surface in a series of parallel lines. The area of the surface in which the laser beam is moved across is an area which is sufficient to achieve a true average of the surface smoothness of the molded plaque, and is typically about 279.44 mm×279.44 mm. The images of these lines are then analyzed by the Loria® surface analyzer for smoothness. The Loria® surface analyzer then calculates the long term Loria® number and the orange peel Loria® number for the tested plaque.

The skins 24 and 26 of the present invention preferably have a long term Loria® number of between about 40 to about 200, more preferably between about 60 to about 120, and most preferably of about 100. Moreover, the skins 24 and 26 of the present invention preferably have an orange peel Loria® number of between 8.0 to about 10.0, and most preferably of about 9.0.

The present invention achieves the above, and other, goals by providing a molding compound for the door skins 24 and 26 which, when molded, has a shrinkage of about −0.0003 to about +0.0015 preferably, about −0.0002 to about +0.0004, and most preferably about +0.0002. Shrinkage is defined as the shrinkage or expansion of a cured part as it is compared to the mold it was molded in. Shrinkage values are obtainable by molding flat plaques, preferably flat plaques being about 3.2 mm thick with a dimension of about 304.8 mm×304.8 mm. The molded part and the mold are measured at room temperature. The molded plaques are allowed to set at least about one day before measuring. Each plaque is measured in four locations, two in the transverse and two in the longitudinal direction. Each measurement is divided by the length of the plaque to get the shrinkage value. Positive measurements yield an expansion reading. Negative measurements yield a shrinkage reading. Shrinkage values are unitless since the units cancel and the same reading is obtained whether it is in./in. or mm/mm.

The molding compounds of the present invention includes sheet molding compounds, bulk (or dough) molding compounds, kneading molding compound, thick molding compounds, and injection molding compounds typically called ZMC.

Preferably, the molding compound of the present invention is a sheet molding compound. The sheet molding compound of the present invention preferably comprises a resin system-catalyst component, a thickener component and a fiber reinforcement component. Generally, the resin system-catalyst component and the thickener component are preferably combined first to form a paste. The fiber reinforcement component is then added to the paste to form the sheet molding compound.

The resin system-catalyst component preferably comprises a resin system, a cure catalyst, a filler material, and an internal lubricant. The resin system-catalyst component may preferably also include a cure inhibitor, additional monomer, and an accelerator.

The thickener component preferably includes chemical thickeners to adjust the Theological properties of the sheet molding compound. The thickener component may further include a monomer, an internal lubricant, a cure inhibitor and a pigment.

By the terms "a" and "an" as used herein with respect to a component, or class of components, of the sheet molding compound, it is meant "one or more". For example, the term "a filler material" means that minimally one filler material is present in the sheet molding compound with two or more filler materials being optionally present in the sheet molding compound. Also, by the term "weight percent" as used herein with respect to a component of the sheet molding compound, it is meant the total weight of the component and not the weight percent solid of the component, unless otherwise specified.

The molding compound of the present invention preferably comprises from about 16.0 to about 33.5 weight percent of the resin system, based on the weight of the molding compound, and more preferably, from about 21.0 to about 29.0 weight percent.

The resin system preferably comprises a curable unsaturated polyester resin, a co-curable unsaturated monomer and at least two low profile additives.

The resin system comprises from about 40 to about 75 weight percent solids, based on the weight of the resin system, and more preferably, from about 48 to about 65 weight percent solids, and most preferably about 55 weight percent solids.

Curable unsaturated polyester resins are well known to those skilled in the art, and are generally prepared in a non-limiting sense, by esterification or transesterification of one or more unsaturated dicarboxylic acids or reactive derivatives thereof with one or more aliphatic or cycloaliphatic diols. Saturated dicarboxylic acids, aromatic dicarboxylic acids, or their reactive derivatives may be used in conjunction with the unsaturated dicarboxylic acid(s) to lower the crosslink density. Curable polyester resins are available commercially, and examples of such are disclosed in U.S. Pat. Nos. 3,969,560; 4,172,059; 4,491,642; and 4,626,570, which are herein incorporated by reference.

The curable unsaturated polyester resins may be a high reactivity polyester resin. Examples of suitable high reactivity polyester resins include, but are not limited to, high reactivity orthophthalic polyester resins, high reactivity isophthalic polyester resins, and high reactivity dicyclopentadiene-modified (DCPD) polyester resins. A particularly preferred curable unsaturated high reactivity polyester resin is a dicyclopentadiene-modified propylene glycol-maleate polyester resin.

Co-curable unsaturated monomers are also well known to those skilled in the art, and include, for example, the various alkylacrylates and alkylmethacrylates as well as vinyltoluene α-methylstyrene, p-methylstyrene, and styrene. By the term "co-curing," it is meant that the monomer contains reactive unsaturation capable of reacting with itself and/or the unsaturated sites of the curable polyester under the curing conditions. Additional co-curable monomers are identified in the above-referenced patents. A particularly preferred co-curable monomer is styrene.

Low profile additives may be defined as relatively polar thermoplastic polymeric materials which, when added to sheet molding compositions, are believed to encourage the formation of numerous microvoids. Such additives are believed to become wholly or partially immiscible with the resin matrix during cure under compression molding conditions, resulting in a multi-phasic polymer system. The immiscibility of the low profile additives may increase the volume of the curing mass, offsetting the volume reduction of the curing and crosslinking unsaturated components. Moreover, the different phases appear to exhibit different degrees of contraction upon cooling. As the compression molded skins cool prior to and after their removal from the mold, the different phases are believed to contract at different rates, which is believed to cause numerous microvoids to be created.

Low profile additives are well known to those skilled in the sheet molding composition art. Low profile additives are generally relatively polar thermoplastic polymers. While the mechanism of microvoid formation is not known with certainty, it is believed that during the cure of the curable polyester and co-curable monomer to form a thermoset structure, a microgel phase is formed from the curing/crosslinking of the unsaturated components which is at least partially incompatible with the low profile additive, which begins to phase-separate. The phase separation is believed to cause an increase in volume of the composition which partially or wholly offsets the shrinkage which results from curing of the polyester/co-curable monomer. The curing polyester forms a matrix which at least partially surrounds the low profile additive phase. Upon cooling, the differences in volume contraction between the two phases is believed to assist in the formation of microvoids. The presence of such microvoids may be observed by microscopic inspection of the surface, and by the porosity which portions of the surface exhibit with respect to absorbance of liquids, which otherwise would be minimal.

Examples of suitable low profile additives include, but are not limited to, polyvinyl acetate, modified polyvinyl acetate, saturated polyester, modified saturated polyester, polymethyl methacrylate, polyurethanes, and styrenic block copolymer - modified rubber. Particularly preferred low profile additives are saturated polyesters and polyvinyl acetates, and more preferably saturated glycol-$C_2$ to $C_6$ dicarboxylic acid polyesters and modified polyvinyl acetates. A preferred resin system is available from Alpha/Owens Corning, of Valpairaso, Ind., under the produce designation E-4295 and comprises a high reactivity dicyclopentadiene-modified propylene glycol-maleate polyester, co-curable styrene monomer, and low profile additives which comprise at least a saturated glycol-$C_2$ to $C_6$ dicarboxylic acid polyester and a modified polyvinyl acetate.

Low shrinkage additives are generally less effective than low profile additives. They are believed to function by increased phase segregation and immiscibility with respect to the molding resin matrix. Low shrinkage additives are believed to assist in the formation of discontinuous islands of material which modify the shrinkage properties of the molded products. However, they generally do not generate microvoids in the molded product. While the use of low shrinkage additives has been used in molding compounds used to manufacture prior art door skins, the present invention does not employ the use of low shrinkage additives.

The molding compound of the present invention preferably comprises from about 0.2 to about 0.9 weight percent of the cure catalyst, based on the weight of the molding compound, and more preferably, from about 0.35 to about 0.65 weight percent.

The cure catalyst is selected from a list that includes, but is not limited to, the following:

diacyl peroxides such as benzoyl peroxide, t-butyl perbenzoate; t-amyl perbenzoate; ketone peroxides such as mixtures of peroxides and hydroperoxides; methyl isobutyl ketone peroxide; 2,4 pentanedione peroxide; methyl ethyl ketone peroxide/perester blend;

peroxydicarbonates such as di(n-propyl) peroxydicarbonate, di(sec-butyl)peroxydicarbonate; di(2-ethylhexyl)peroxydicarbonate; Bis(4-t-butyl-cyclohexyl) peroxydicarbonate; diisopropylperoxydicarbonate; dicetyl peroxydicarbonate;

peroxyesters such as alpha-cumyl peroxydecanoate; alpha-cumyl peroxyneoheptanoate; t-butylperoxyneodecanoate; t-butylperoxypivalate; 1,5-dimethyl 2,5-di(2-ethylhexanoylperoxy)hexane, t-butylperoxy-2-ethylheanoate; t-butylperoxy-isobutyrate; t-butylperoxymaleic acid, OO-t-butyl-O-isopropyl monopercarbonate; 2,5-dimethyl-2,5-di(benzoylperoxy)hexane, t-butylperoxy-acetate; t-butylperoxybenzoate; di-t-butyl diperoxyphthalate; mixtures of peroxyester and peroxyketal; t-amylperoxyneodecanoate; t-amylperoxypivalate, t-amylperoxy(2-ethylhexanoate); t-amylperoxyacetate; t-amylperoxybenzoate, t-butylperoxy-2-methyl benzoate;

diakylperoxides such as dicumyl peroxide; 2,5-dimethyl-2,5-di(t-butylperoxy)hexane; 2,5-dimethyl-2,5-di(t-butylperoxy)dexyne-3; t-butyl cumyl peroxide; a-a-bis (t-butylperoxy)diisopropylbenzene; di-t-butyl peroxide; hydroperoxides such as 2,5=dihydro-peroxy-2,5-dimethylhexane; cumene hydroperoxide; t-butyl hydroperoxide;

peroxyketals such as 1,1-di(t-butylperoxy) 3,3,5-trimethylcyclohexane; 1,1-di(t-butylperoxy) cyclohexane; ethyl-3,3-di(t-butylperoxy) butyrate; n-butyl 4,4-bis(t-butylperoxy)valerate; cyclic peroxyketal; 1,1-di(t-amylperoxy)cyclohexane; 2,2-di-t-amylperoxy propane.

The preferred cure catalysts are t-butyl perbenzoate; t-amyl perbenzoate; 1,5-dimethyl 2,5-di (ethylhexanoylperoxy)heaxane; t-butylperoxy-2-ethylhexanoate; OO-t-butyl-O-isopropyl monopercarbonate; 2,5-dimethyl-2,5-di(benzoylperoxy)hexane; 1,1-di(t-butylperoxy) 3,3,5-trimethylcyclohexane; 1,1-di(t-butylperoxy)cyclohexane; ethyl-3,3-di(t-butylperoxy) butyrate; 1,1-di(t-amylperoxy)cyclohexane; and 2,2-di-t-amylperoxy propane or combinations thereof.

The molding compound of the present invention preferably comprises from about 30.0 to about 70.0 weight percent of filler, based on the weight of the molding compound, and more preferably, from about 40.0 to about 65.0 weight percent and even more preferably, from about 45.0 to about 59.0 weight percent.

Fillers are principally materials for occupying space, but may contribute to the mechanical, functional or aesthetic properties of the molded article or door. Suitable fillers include, but are not limited to, calcium carbonate; magnesium carbonate; aluminum trihydrate; anhydrous calcium sulfate; gypsum; kaolin clays; barium sulfate; nepheline syenite; ground silicas; wollastonite; saw dust; excelsior; minerals with aspect ratio of 4 or less; hollow glass or ceramic microspheres; ground agricultural wastes; mixtures of any or all of these as well as many others known in the art, including fillers which have been treated with coupling agent or low profile agent coatings. The most preferred filler is calcium carbonate having average particle size of 3–8 $\mu$m, preferably about 5 $\mu$m.

The resin system-catalyst component of the molding compound preferably includes any internal lubricant contemplated by one skilled in the molding compound art in an amount of from about 0.5 to about 2.3 weight percent, based on the weight of the molding compound.

Cure inhibitors may be employed to retard the polymerization of the unsaturated polyester resin in the sheet molding compound. If cure inhibitors are employed in the resin system-catalyst component, the molding compound of the present invention preferably comprise no more than about 0.3 weight percent of cure inhibitors in the resin-system catalyst component, based on the weight of the molding compound, and more preferably, from about 0.01 to 0.2 weight percent. Suitable cure inhibitors include, but are not limited to, substituted phenolic derivatives such as hydroquinone, quinone, and para-benzoquinone; and quaternary ammonium salts, especially of strong bases such as trimethyl benzylammonium chloride or bromide.

In the present invention, the preferred cure inhibitor, when used, is para-benzoquinone.

The additional monomer is separate from the co-curable monomer in the resin system, and, if used in the resin system-catalyst component, is preferably present in an amount less than about 7.0 weight percent, based on the weight of the molding compound. Suitable monomers, include, but are not limited to, the monomers useable as the co-curable unsaturated monomer in the resin system.

Accelerators, may optionally be used to help reduce cure times. Accelerators, when used, act as additional classes of cure catalysts for the unsaturated polyesters. Suitable compounds useable as accelerators include, but are not limited to, cobalt compounds such as cobalt naphthenate and octanoate.

The thickener component of the molding compound preferably comprises from about 0.2 to about 0.9 weight percent of a chemical thickener, based on the weight of the molding compound. Any suitable chemical thickener contemplated by one skilled in the molding compound art may be used.

The thickener component of the molding compound may also contain other known molding compound additives including, but not limited to, pigment, monomer, cure inhibitor and internal lubricant.

The pigment may be any pigment contemplated by one skilled in the molding compound art. If pigment is used, it is preferred that the pigment be present in the molding compound in an amount of about 5 weight percent or less, based on the weight of the molding compound.

The list of monomers useable in the thickener component includes, but is not limited to, the monomers useable in the resin system component. If monomer is used in the thickener component of the molding compound, it is preferred that the monomer in the thickener component be present in an amount of about 3 weight percent or less, based on the weight of the molding compound.

If an internal lubricant is used in the thickener component, the internal lubricant may be any internal lubricant contemplated by one skilled in the molding compound art, and is preferably present in the thickener component in an amount of about 1.3 weight percent or less, based on the weight of the molding compound.

If cure inhibitors are employed in the thickener component, the molding compound of the present invention preferably comprises no more than about 0.3 weight percent of cure inhibitors in the thickener component, based on the weight of the molding compound.

The molding compound of the present invention preferably comprises from about 15.0 to about 35.0 weight percent of fiber reinforcement, based on the weight of the molding compound, and more preferably, from about 18.0 to about 27.0 weight percent, and even more preferably, from about 19 to about 22 weight percent.

The fiber reinforcement is approximately 2.5 cm long +/−1 cm. The longer length of the fiber reinforcement differentiates sheet molding compound from the bulk molding compounds and ZMC, and provides the stronger mechanical properties relative to the comparable formulation of these two other compounds. The fiber reinforcement is selected from a list including, but not limited to, fiberglass; carbon fiber; aramid fiber; lignocellulosic fibers; agricultural fibers; natural and synthetic textile fibers; olefinic fibers, including oriented olefinic fibers; mineral reinforcements with aspect ratios in excess of about 4; or mixtures of any or all of these reinforcements. Fiberglass is the preferred fiber reinforcement, and is most preferable about 2.5 cm long chopped 23C fiberglass fiber such as is available from CertainTeed, Corp.

Having generally described the present invention, a further understanding can be obtained by reference to certain specific examples which are provided herein for purposes of illustration only and are not intended to be limiting unless otherwise specified.

EXAMPLE 1

A preferred molding compound of the present invention which is capable of producing door skins having thicknesses of between about 1.0 mm and about 2.5 mm; widths of between about 0.75 m and about 1.07 m; and lengths of between about 1.95 m and about 2.45 m and having a shrinkage of between about −0.0003 to about +0.0015 comprises the following:

TABLE 1

| ITEM | WT % OF MOLDING COMPOUND |
|---|---|
| Resin System-Catalyst Component | |
| Resin system[1] | 25.35 |
| Mineral filler[2] | 50.71 |
| Cure catalyst[3] | 0.38 |
| Cure inhibitor[4] | 0.05 |
| Internal lubricant[5] | 1.18 |
| Thickener component | |
| Thickener[6] | 0.38 |
| Pigment[7] | 1.12 |
| Monomer[8] | 0.28 |
| Internal lubricant[9] | 0.54 |
| Cure Inhibitor[4] | 0.01 |
| Fiber reinforcement[10] | 20.0 |

[1]Alpha/Owens Corning B-4295 (low profile resin system comprising a polyester resin, low profile additives, and monomer)
[2]Huber ® W-4 from J.M. Huber Corporation, Engineered Materials Division of Quincy, Illinois
[3]t-Butylperoxybenzoate from Aztec Peroxides, Inc., of Elyria, Ohio
[4]Ashland Mod-E (5% PBQ) from Ashland Chemical Co., Composite Polymers Division, of Columbus, Ohio
[5]66 wt. % Norac Coad 10 calcium stearate from The Norac Co., Inc. of Azusa California, and 34 wt. % zinc stearate XM Powder HyDense ® of Mallinckrodt Speciality Chemicals Co., of Chesterfield, Missouri
[6]PG-9033 from Plasticolors, Inc., of Astabula, Ohio
[7]CP-10028 from Alpha/Owens Corning of Guelph, Ontario, Canada
[8]Vinyltoluene
[9]20 wt. % zinc stearate from the Synthetic Products, of Cleveland, Ohio, and 80 wt. % zinc stearate XM Powder HyDense ® of Mallinckrodt Speciality Chemicals Co., of Chesterfield, Missouri
[10]23C from CertainTeed Corp., of Wichita Falls, Texas The resin system is mixed, by techniques known in the art, with the mineral filler, cure catalyst, internal lubricant and cure inhibitor being mixed in a low shear Ross mixer. Preferably, the resin system is mixed first with the cure catalyst, with the internal lubricant being added to the mixer next, followed by the mineral filler. The mixture is transferred to a high shear dynamic mixer, such as a Shar mixer or a Finn and Fram mixer. The thickener component is preferably prepared in a separate mixer and is then transferred to the high shear dynamic mixer for blending with the resin system-catalyst component.

The preparation of sheets of sheet molding compound is known in the art. For example, Shannon and Denton describe a method of making molding compounds in U.S. Pat. No. 4,105,623, which is incorporated by reference. The mixture is removed from the high shear dynamic mixer and supplied under pressure to a manifold that applies the paste to a traveling sheet of plastic transport film. Fiberglass roving is chopped to approximately 2.5 cm+/−1 cm lengths and sprinkled, in an essentially uniform manner, over the mixture as it continues to travel on the plastic transport film. A balancing layer of the mixture is applied from a second manifold in order to sandwich the chopped fiberglass layer. The balancing layer is covered by a plastic covering film forming a sheet molding compound sheet. The entire sheet molding compound sheet is compacted, thereby, enhancing the mixing of fiberglass and resin; allowed to maturate for about 2 days in special styrene transfer resistant wrapping; and molded in a match compression mold at approximately 148° C.–160° C. for about 70 seconds at approximately 3.5–10.3 MPa of pressure to yield a door skin having a thickness of between about 1.0 mm and about 2.5 mm; a width of between about 0.75 m and about 1.07 m; and a length of between about 1.95 m and about 2.45 m.

Assembly of door 10 of the present invention is completed by securing, in any suitable manner, and preferably with an adhesive, the first door skin 24 to a first side of a frame 14 housing a core 12, and the second skin 26 to a second side of the frame. The combined thickness of the door skins 24 and 26, core 12 and frame 14 ranges is preferably from about 1.375–2.5 inches.

EXAMPLE 2 AND COMPARATIVE EXAMPLES A AND B

Example 2 is a mixture prepared according to the sheet molding compound in Example 1. Comparative Example A is prepared from a sheet molding compound comprising a resin system having a polyester resin, two low shrinkage additives and no low profile additives. Comparative Example B is prepared for a sheet molding compound having a polyester resin, one low shrinkage additive, and only one low profile additive. The polyester resin in Example 1 is different from the polyester resin in Comparative Example A, but is the same as the polyester resin in Comparative Example B. The low profile additive in Comparative Example B is the same as a low profile additive in Example 1.

The shrinkage of cured plaques of the sheet molding compounds of Example 2 and Comparative Examples A and B, as compared to the mold they were molded in, was measured at room temperature. The plaques were molded to be planar and have an average thickness of about 3.2 mm and dimensions of about 304.8 mm×304.8 mm. A check fixture with dial indicators was made to check the plaques. A calibration gauge was used to zero the fixture to the size of the mold. The molded plaques were allowed to set at least one day before being measured. Each plaque was measured in four locations, two in the transverse and two in the longitudinal direction. Each dial reading was divided by the length of the plaque to get the shrinkage value. Table 2 displays the shrinkage for each of the plaques.

TABLE 2

| Cured Sheet Molding Compound Plaque | Shrinkage |
| --- | --- |
| Example 2 | −0.0002 |
| Comparative Example A | −0.0007 |
| Comparative Example B | −0.0004 |

The surfaces of the plaques were analyzed by a Loria® surface analyzer. The plaques were molded in a flat mold in which the show surface had been highly polished to a mirror finish. The Loria® surface analyzer reflected a laser beam off the surface of the object. The laser beam was moved across the surface of the plaques in a series of parallel lines over an area of about 279.4 mm×279.4 mm. The reflected beam is projected unto a reflective screen. The image is then picked up off the screen by a high-resolution video camera. The images of these lines were then analyzed for smoothness. From this analysis, the long term Loria® number and the orange peel Loria® number were obtained. With long term Loria® number, the smaller the number, the smoother the surface. With orange peel Loria® number, the scale is 0–10, with 10 being the smoothest surface. Table 3 displays the long term and orange peel Loria® number for each of the plaques.

TABLE 3

| Property | Example 2 | Comparative Example A | Comparative Example B |
| --- | --- | --- | --- |
| Long Term Loria ® Number | 119 | I.A. | I.A. |
| Orange Peel Loria ® Number | 8.2 | 7.5 | 6.3 |

I.A. indicates that an accurate reading could not be attained.

The long term Loria® number for Comparative Examples A and B could not be accurately obtained. This indicates that the sheet molding compounds used to make the plaques of Comparative Examples A and B produced surfaces which were too dull to enable the Loria® surface analyzer to record accurate reading. The Loria® surface analyzer can only attain an accurate long term Loria® number readings for samples having a long term Loria® numbers below about 250. Thus, it can be concluded that the long term Loria® number of the plaques of Comparative Examples A and B are above about 250.

While the best modes for carrying out the invention have been described in detail, those familiar with the art to which the invention relates will appreciate other ways of carrying out the invention defined by the following claims.

What is claimed is:

1. An entry way door member comprising:
   a frame having a first side and a second side, opposite the first side; and
   a molded skin attached to the first side of the frame, the skin being prepared from a molding compound which, when molded in a flat plaque mold, has a shrinkage of between about −0.0003 to about +0.0015.

2. The door member of claim 1 wherein the skin has a width of between about 0.75 m and about 1.07 m, a length of between about 1.95 m and about 2.45 m, and an average thickness of between about 1.0 mm and about 2.5 mm.

3. The door member of claim 1 wherein the molding compound has a long term Loria number of less than about 250 when molded in a highly polished flat plaque mold.

4. The door member of claim 1 wherein the molding compound has an orange peel Loria number of above about 7.5 when molded in a highly polished flat plaque mold.

5. The door member of claim 1 further comprising a second door skin attached to said second side of said frame.

6. The door member of claim 1 further comprising a core positioned within the frame.

7. The door member of claim 6 wherein the core is made of phenolic material.

8. The door member of claim 1 wherein the molding compound comprises:
   a) a resin system comprising at least one low profile additive;
   b) filler material; and
   c) fibrous reinforcement.

9. The door member of claim 8 wherein the resin system is present in the molding compound in an amount of about 16 weight percent to about 33.5 weight percent, based on the weight of the molding compound.

10. The door member of claim 8 wherein the resin system comprises a dicyclopentadiene-modified polyester resin.

11. The door member of claim 8 wherein the resin system comprises a dicyclopentadiene-modified propylene glycol-maleate polyester resin.

12. The door member of claim 8 wherein the low profile additive comprises a thermoplastic polymer.

13. The door member of claim 12 wherein the low profile additive is selected from the group consisting of polyvinyl acetate, modified polyvinyl acetate, saturated polyester, modified saturated polyester, polymethylmethacrylate, polyurethanes and styrenic block copolymer-modified rubber.

14. The door member of claim 13 wherein the low profile additive comprises a saturated glycol-$C_2$ to $C_6$ dicarboxylic acid polyester.

15. The door member of claim 13 wherein the low profile additive comprises a modified polyvinyl acetate.

16. The door member of claim 15 wherein a second low profile additive is present.

17. The door member of claim 16 wherein the second low profile additive comprises a saturated glycol-$C_2$ to $C_6$ dicarboxylic acid polyester.

18. The door member of claim 8 wherein the molding compound is free of low shrinkage additives.

19. The door member of claim 1 wherein the molding compound comprises:
 a) a resin system comprising:
  i) a curable resin;
  ii) a co-curable unsaturated monomer; and
  iii) at least one low profile additive;
 b) at least about 30 percent by weight of filler material, based on the weight of the molding compound; and
 c) fibrous reinforcement present in an amount of less than about 35 weight percent, based on the weight of tie molding compound.

20. The door member of claim 19 wherein the resin system is present in the molding compound in an amount of about 16 weight percent to about 33.5 weight percent, based on the weight of the molding compound.

21. The door member of claim 20 wherein the curable resin comprises dicyclopentadiene-modified polyester resin.

22. The door member of claim 20 wherein the curable resin comprises dicyclopentadiene-modified propylene glycol-maleate polyester resin.

23. The door member of claim 20 wherein the low profile additive comprises a thermoplastic polymer.

24. The door member of claim 23 wherein the low profile additive is selected from the group consisting of polyvinyl acetate, modified polyvinyl acetate, saturated polyester, modified saturated polyester, polymethylmethacrylate, polyurethanes and styrenic block copolymer-modified rubber.

25. The door member of claim 24 wherein the low profile additive comprises a modified polyvinyl acetate.

26. The door member of claim 24 wherein the low profile additive comprises a saturated glycol-$C_2$ to $C_6$ dicarboxylic acid polyester.

27. The door member of claim 26 wherein a second low profile additive is present.

28. The door member of claim 27 wherein the second low profile additive comprises a modified polyvinyl acetate.

29. The door member of claim 19 wherein the molding compound is free of low shrinkage additives.

30. A method of making an entry way door member, said method comprising:
 providing a frame having a first side and a second side, opposite the first side;
 providing a core within said frame;
 providing a skin molded from a molding compound which, when molded in a flat plaque mold, has a shrinkage of between about −0.0003 to about +0.0015; and
 attaching said skin to the, fat side of said frame.

31. The method of claim 30 wherein the skin has a width of between about 0.75 m and about 1.07 m, a length of between about 1.95 m and about 2.45 m, and an average thickness of between about 1.0 mm and about 2.5 mm.

32. The method of claim 30 wherein the molding compound has a long term Loria number of less than about 250 when molded in a highly polished flat plaque mold.

33. The method of claim 30 wherein the molding compound has an orange peel Loria number of above about 7.5 when molded in a highly polished flat plaque mold.

34. The method of claim 30 further comprising attaching a second door skin to the second side of said frame.

35. The method of claim 30 wherein the core is made of phenolic material.

36. The method of claim 30 wherein the molding compound comprises:
 a) a resin system comprising at least one low profile additive;
 b) filler material; and
 c) fibrous reinforcement.

37. The method of claim 36 wherein the resin system is present in the molding compound in an amount of about 16 weight percent to about 33.5 weight percent, based on the weight of the molding compound.

38. The method of claim 36 wherein the resin system comprises a dicyclopentadiene-modified polyester resin.

39. The method of claim 36 wherein the resin system comprises a dicyclopentadiene-modified propylene glycol-maleate polyester resin.

40. The method of claim 36 wherein the low profile additive comprises a thermoplastic polymer.

41. The method of claim 40 wherein the low profile additive is selected from the group consisting of polyvinyl acetate, modified polyvinyl acetate, saturated polyester, modified saturated polyester, polymethylmethacrylate, polyurethanes and styrenic block copolymer-modified rubber.

42. The method of claim 41 wherein the low profile additive comprises a saturated glycol-$C_2$ to $C_6$ dicarboxylic acid polyester.

43. The method of claim 41 wherein the low profile additive comprises a modified polyvinyl acetate.

44. The method of claim 40 wherein a second low profile additive is present.

45. The method of claim 44 wherein the second low profile additive comprises a saturated glycol-$C_2$ to $C_6$ dicarboxylic acid polyester.

46. The method of claim 36 wherein the molding compound is free of low shrinkage additives.

47. The method of claim 30 wherein the molding compound comprises:
 a) a resin system comprising:
  i) a curable resin;
  ii) a co-curable unsaturated monomer; and
  iii) at least one low profile additive;
 b) at least about 30 percent by weight of filler material, based on the weight of the molding compound; and
 c) fibrous reinforcement present in an amount of less than about 35 weight percent, based on the weight of the molding compound.

48. The method of claim 47 wherein the resin system is present in the molding compound in an amount of about 16 weight percent to about 33.5 weight percent, based on the weight of the molding compound.

49. The method of claim 48 wherein the curable resin comprises dicyclopentadiene-modified polyester resin.

50. The method of claim 48 wherein the curable resin comprises dicyclopentadiene-modified propylene glycol-maleate polyester resin.

51. The method of claim 48 wherein the low profile additive comprises a thermoplastic polymer.

52. The method of claim 51 wherein the low profile additive is selected from the group consisting of polyvinyl acetate, modified polyvinyl acetate, saturated polyester, modified saturated polyester, polymethylmethacrylate, polyurethanes and styrenic block copolymer-modified rubber.

53. The method of claim 52 wherein the low profile additive comprises a modified polyvinyl acetate.

54. The method of claim 52 wherein the low profile additive comprises a saturated glycol-$C_2$ to $C_6$ dicarboxylic acid polyester.

55. The method of claim 54 wherein a second low profile additive is present.

56. The method of claim 55 wherein the second low profile additive comprises a modified polyvinyl acetate.

57. The method of claim 47 wherein the molding compound is free of low shrinkage additives.

58. An entry way door member comprising:
a frame having a first side and a second side, opposite the first side; and
a molded skin attached to the first side of the frame, the skin being prepared from a molding compound that has a long term Loria number of less than about 250 when molded in a highly polished flat plaque mold.

59. The door member of claim 58 wherein the molding compound comprises:
a) a resin system comprising at least two low profile additives;
b) filler material; and
c) fibrous reinforcement.

60. The door member of claim 58 wherein the molding compound comprises:
a) a resin system comprising:
i) a curable resin;
ii) a co-curable unsaturated monorner; and
iii) at least one low profile additive;
b) at least about 30 percent by weight of filler material, based on the weight of the molding compound; and
c) fibrous reinforcement present in an amount of less than about 35 weight percent, based on the weight of the molding compound.

61. An entry way door member comprising:
a frame having a first side and a second side, opposite the first side; and
a molded skin attached to the first side of the frame, the skin being prepared from a molding compound that has an orange peel Loria number of above about 7.5 when molded in a highly polished flat plaque mold.

62. The door member of claim 61 wherein the molding compound comprises:
a) a resin system comprising at least two low profile additives;
b) filler material; and
c) fibrous reinforcement.

63. The door member of claim 61 wherein the molding compound comprises:
a) a resin system comprising:
i) a curable resin;
ii) a co-curable unsaturated monomer; and
iii) at least one low profile additive;
b) at least about 30 percent by weight of filler material, based on the weight of the molding compound; and
c) fibrous reinforcement present in an amount of less than about 35 weight percent, based on the weight of he molding compound.

64. A method of making an entry way door member, said method comprising:
providing a frame having a first side and a second side, opposite the first side;
providing a core within said frame;
providing a skin molded from a molding compound which has a long term Loria number of less than about 250 when molded in a highly polished flat plaque mold; and
attaching said skin to the first side of said frame.

65. The method of claim 64 wherein the molding compound comprises:
a) a resin system comprising at least two low profile additives;
b) filler material; and
c) fibrous reinforcement.

66. The method of claim 64 wherein the molding compound comprises:
a) a resin system comprising:
i) a curable resin;
ii) a co-curable unsaturated monomer; and
iii) at least one low profile additive;
b) at least about 30 percent by weight of filler material, based on the weight of the molding compound; and
c) fibrous reinforcement present in an amount of less than about 35 weight percent, based oil the weight of the molding compound.

67. A method of making an entry way door member, said method comprising:
providing a frame having a first side and a second side, opposite the first side;
providing a core within said frame;
providing a skin molded from a molding compound which has an orange peel Loria number of above about 7.5 when molded in a highly polished flat plaque mold; and
attaching said skin to the first side of said frame.

68. The method of claim 67 wherein the molding compound comprises:
a) a resin system comprising at least two low profile additives;
b) filler material; and
c) fibrous reinforcement.

69. The method of claim 67 wherein the molding compound comprises
a) a resin system comprising:
i) a curable resin;
ii) a co-curable unsaturated monomer; and
iii) at least one low profile additive;
b) at least about 30 percent by weight of filler material, based on the weight of the molding compound; and
c) fibrous reinforcement present in an amount of less than about 35 weight percent, based on the weight of the molding compound.

70. The door member of claim 19 wherein the molding compound comprises at least about 40 percent by weight of filler material, based on the weight of the molding compound.

71. The door member of claim 19 wherein the filler material comprises only calcium carbonate.

72. The door member of claim 19 wherein the molding compound comprises fibrous reinforcement present in an amount of less than about 27 weight percent, based on the weight of the molding compound.

73. The method of claim 30 wherein the molding compound comprises at least about 40 percent by weight of filler material, based on the weight of the molding compound.

74. The method of claim 30 wherein the filler material comprises only calcium carbonate.

75. The method of claim 30 wherein the molding compound comprises fibrous reinforcement present in an amount of less than about 27 weight percent, based on the weight of the molding compound.

76. The door member of claim 60 wherein the molding compound comprises at least about 40 percent by weight of filler material, based on the weight of the molding compound.

77. The door member of claim 60 wherein the filler material comprises only calcium carbonate.

78. The door member of claim 60 wherein the molding compound comprises fibrous reinforcement present in an amount of less than about 27 weight percent, based on the weight of the molding compound.

79. The door member of claim 1 wherein the skin has a surface that is essentially smooth.

80. The door member of claim 79 wherein the surface of the skin is capable of attaining a high gloss finish when painted.

81. The method of claim 30 wherein the skin has a surface that is essentially smooth.

82. The method of claim 81 wherein the surface of the skin is capable of attaining a high gloss finish when painted.

83. The door member of claim 58 wherein the skin has a surface that is essentially smooth.

84. The door member of claim 83 wherein the surface of the skin is capable of attaining a high gloss finish when painted.

85. The door member of claim 61 wherein the skin has a surface that is essentially smooth.

86. The door member of claim 85 wherein the surface of the skin is capable of attaining a high gloss finish when painted.

87. The method of claim 64 wherein the skin has a surface that is essentially smooth.

88. The method of claim 87 wherein the surface of the skin is capable of attaining a high gloss finish when painted.

89. The method of claim 67 wherein the skin has a surface that is essentially smooth.

90. The method of claim 89 wherein the surface of the skin is capable of attaining a high gloss finish when painted.

91. An entry way door member comprising:
   a frame having a first side and a second side, opposite the first side;
   a core within the frame;
   a first molded skin attached to the first side of the frame; and
   a second molded skin attached to the second side of the frame;
   each of the first and second skins being prepared from a molding compound which, when molded in a flat plaque mold, has a shrinkage of between about −0.0003 to about +0.0015 and having an outer surface that has a substantial portion that is smooth.

92. An entry way door member comprising:
   a frame having a first side and a second side, opposite the first side;
   a core within the frame;
   a first molded skin attached to the first side of the frame; and
   a second molded skin attached to the second side of the frame;
   the first and second skins being prepared from a molding compound which, when molded in a flat plaque mold, has a shrinkage of between about −0.0003 to about +0.0015;
   wherein each of the skins have an outer surface that has a substantial portion that is essentially smooth and is capable of attaining a high gloss finish when painted.

* * * * *

UNITED STATES PATENT AND TRADEMARK OFFICE
CERTIFICATE OF CORRECTION

PATENT NO.  : 6,487,824 B1
DATED       : December 3, 2002
INVENTOR(S) : Kenneth J. West and G. Daniel Templeton It is certified that error appears in the above-identified patent and that said Letters Patent is hereby corrected as shown below:

<u>Column 13,</u>
Line 65, replace "fat" with -- first --.

Signed and Sealed this

Twenty-second Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,487,824 B1
DATED         : December 3, 2002
INVENTOR(S)   : Kenneth J. West and G. Daniel Templeton It is certified that error appears in the above-identified patent and that said Letters Patent is hereby corrected as shown below:

Column 13,
Line 28, replace "tie" with -- the --.

Column 15,
Line 36, replace "monorner" with -- monomer --.
Line 66, replace "he" with -- the --.

Column 16,
Line 26, replace "oil" with -- on --.

Signed and Sealed this

Tenth Day of June, 2003

JAMES E. ROGAN
*Director of the United States Patent and Trademark Office*